United States Patent [19]
Kisaka et al.

[11] Patent Number: 5,994,866
[45] Date of Patent: Nov. 30, 1999

[54] MOTOR CONTROLLER AND DISK DRIVE UNIT

[75] Inventors: Masashi Kisaka, Yokohama; Kenji Toga, Fujisawa; Hiroshi Uchiike, Yamato, all of Japan

[73] Assignee: International Business Machines Corporation, Armonk, N.Y.

[21] Appl. No.: 08/903,107

[22] Filed: Jul. 29, 1997

[30] Foreign Application Priority Data

Jul. 29, 1996 [JP] Japan ..................................... 8-198588

[51] Int. Cl.[6] ..................................................... G05B 1/02
[52] U.S. Cl. ........................................... 318/607; 388/805
[58] Field of Search .................................... 388/805, 806, 388/812–814, 820; 318/607, 671, 684

[56] References Cited

U.S. PATENT DOCUMENTS

| | | | |
|---|---|---|---|
| 4,599,545 | 7/1986 | Moriki et al. | 318/314 |
| 4,739,230 | 4/1988 | Sonobe et al. | 318/301 |
| 5,223,772 | 6/1993 | Carbolante | 318/254 |
| 5,543,697 | 8/1996 | Carbolante et al. | 318/594 |

OTHER PUBLICATIONS

Proposition of Minimum Stead–State Dispersion Method, Shingagku Theory A, J76–A. No. 3, pp. 364–371, Mar. 1993.

*Primary Examiner*—Robert E. Nappi
*Assistant Examiner*—Rina I. Duda
*Attorney, Agent, or Firm*—Monica D. Lee; Randall J. Bluestone

[57] ABSTRACT

A motor having enhanced transient characteristics during the acceleration time of the motor in a disk unit. The motor includes a motor controller having a phase-locked loop (PLL) or frequency-locked loop (FLL) for controlling the speed of a spindle motor in a disk drive. The PLL or FLL is coupled to a digital filter. The difference between a phase or frequency synchronized with the rotational speed of the motor and a target value is received by the digital filter. The digital filter output is added to the target value. The sum of the filter output and the target value is set in the PLL or FLL as an adjusted target value to perform PLL control or FLL control. With this arrangement, the time to shift from a low-speed rotation state to a high-speed rotation state can be shortened.

28 Claims, 5 Drawing Sheets

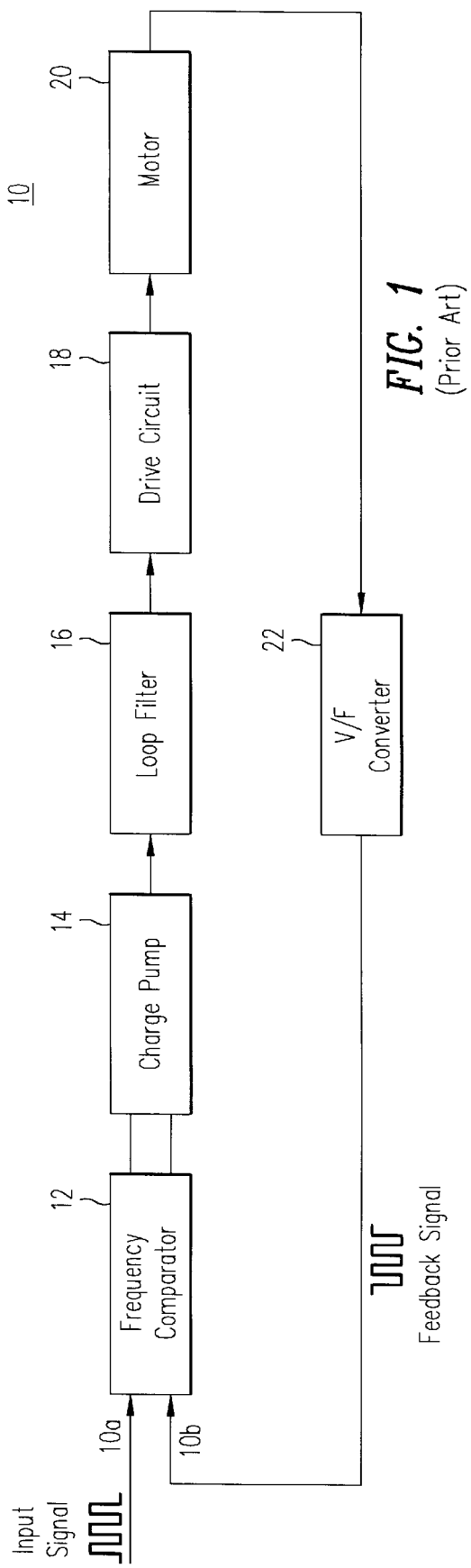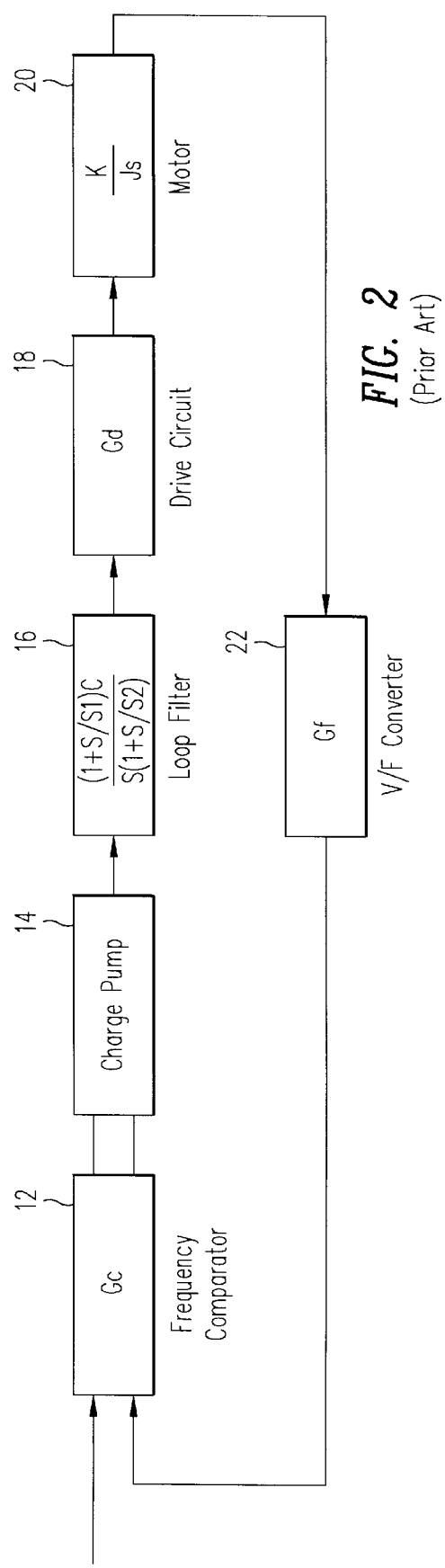

K1, K2 : Constant
B : Sample Lagging Element

MOTOR CONTROLLER AND DISK DRIVE UNIT

BACKGROUND OF THE INVENTION

1. Field of the Invention the present invention relates to a motor controller and a disk drive unit, and more particularly to a disk drive unit having accurate control of the rotational speed of a motor, such as a hard-disk drive.

2. Description of Related Art

Conventional disk drives typically use a spindle motor to rotate the disk or disks in the disk drive. The high-speed rotation (e.g., 5400 rpm) of a disk is achieved by fixing a hub, which integrally holds the disk, to the spindle motor and by transmitting the rotation of the spindle motor to the hub. A head typically flys above the disk at a predetermined fly height providing a gap between the head and the disk. When the head is positioned over the desired track, data may be read from or written to that track. When the motor does not accurately rotate the disk, it is difficult for the head to follow the track often leading to data errors when writing to or reading from the disk. Therefore, the disk drive is required to prevent these types of data errors to maintain stable high-speed rotation of the disks.

One method of controlling the rotational speed of a motor used in a disk drive is to compare a target frequency or a target phase with the frequency or the phase in synchronization with the actually measured rotational speed of the motor. The driving current of the motor is controlled by this difference. Such methods of controlling the motor speed is often referred to as the phase-locked loop (PLL) or frequency-locked loop (FLL) control methods. FIG. 1 illustrates a block diagram of a conventional FLL used for motor control.

According to FIG. 1, a target frequency and a measured frequency are provided to a frequency comparator 12 at inputs 10a and 10b, respectively. The target frequency represents the frequency of the input signal into the FLL circuit 10 and the measured frequency represents the feedback signal of the FLL circuit 10. The output of the frequency comparator 12 is coupled to a charge pump 14. The difference between the two input frequencies of the charge pump 14 control the amount of current generated and output by the charge pump 14. The output of the charge pump 14 is provided to the loop filter 16 for shaping the waveform. The loop filter 16 output is provided to a drive circuit 18. The drive circuit 18 generates and outputs a motor driving current. By controlling the driving current in this manner, a motor 20 is rotated. The rotational velocity of the motor 20 is converted to a frequency by a velocity/frequency (V/F) converter 22 and is provided to frequency comparator 12 as the measured frequency at input 10b. FIG. 2 illustrates the gain of the elements in the FLL circuit 10.

A drawback of the conventional motor speed controller using FLL or PLL control methods, such as FLL circuit 10 shown in FIG. 1, is that it is difficult to obtain a high-speed transient response. In other words, the time it takes to get the disk or disks into uniform motion is relatively slow. This results from a relatively large time constant of the loop filter in the PLL or FLL circuits. When there is an attempt to achieve high-speed and high-precision rotation of disk(s) in a disk drive, the impact of high frequency noise must be minimized. In order to filter out the impact of noise, there is the need to limit the gain, and consequently, the time constant cannot be reduced. Therefore, it is difficult to achieve a high-speed transient response with the conventional FLL or PLL circuits.

In the latest disk drives, particularly those used in personal computers, when the disk is not accessed within a predetermined amount of time, the current supply to the spindle motor is reduced or stopped in order to reduce dissipation power. Accordingly, the spindle motor is stopped or operates with reduced speed. In a power-saving disk drive such as this, if there is a request to access a disk during the time the disk is in its stopped state or being rotated at low speeds (i.e., the low power state), the rotational speed of the disk must be increased to a predetermined rotational speed. Data may be accessed from the disk once the rotation of the disk has been returned to the rotational speed at which data can be written to or read from the disk. Thus, the performance of the disk drive may be enhanced by how quickly the disk is returned to a predetermined rotational speed.

SUMMARY OF THE INVENTION

It is an object of the invention to transition a motor from a low-speed rotation state to a high-speed rotation state within a shortened time period.

Another object of the invention is to design a motor control circuit having a high-speed transient response.

The motor speed controller in one embodiment of the present invention improves transient characteristics by inputting a difference between a rotational frequency of a motor, measured during a transient state, and a target frequency into a digital filter and then by adding the filter output to the target frequency. The transient state refers to a period of time from a motor in a stopped state to a high-speed rotation state.

The motor control circuit in a disk drive of one embodiment of the present invention inputs the difference in frequency between a frequency obtained from the measured current rotational speed of a motor and a target frequency into a digital filter. The filter output is added to the target frequency previously set in a FLL circuit. The sum of the frequency provides an adjusted target frequency. The adjusted target frequency is input into a comparator in the FLL circuit. The driving force of the spindle motor is controlled by the difference in frequency of the adjusted target and the measured frequency. According to one embodiment of the present invention, the target frequency is updated in sequence during a transient state. When the difference between the original final target speed and the current rotational speed of the motor is less than a predetermined value, the frequency corresponding to the final constant target speed is input to the comparator so that the control can be shifted to general FLL control. For alternative embodiments, the present invention may use a PLL circuit by replacing frequency comparator 12 with a phase comparator and replacing the loop filter characteristics with a value used for PLL control.

Other objects, features, and advantages of the present invention will be apparent from the accompanying drawings and from the detailed description below.

BRIEF DESCRIPTION OF THE DRAWINGS

The present invention is illustrated by way of example and not limitation in the figures of the accompanying drawings, in which like references indicate similar elements, and in which:

FIG. 1 illustrates a block diagram of a conventional motor control circuit in a disk drive;

FIG. 2 illustrates the feedback diagram of the conventional motor control circuit shown in FIG. 1;

DETAILED DESCRIPTION

Figure 3:
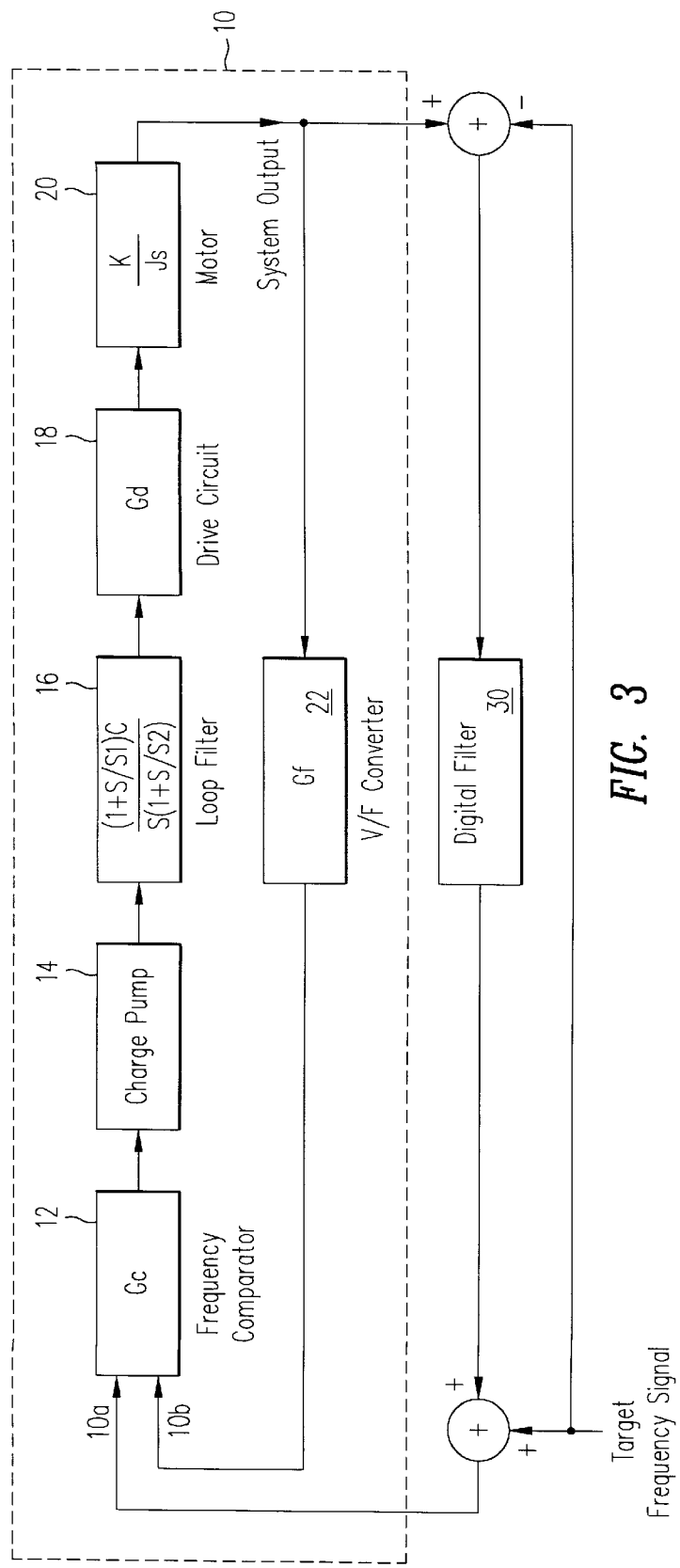
FIG. 3 illustrates a feedback diagram of one embodiment of the present invention.

A block diagram of a motor control circuit of one embodiment of the present invention is shown in FIG. 3. An FLL circuit 10 shown in FIG. 3 is similar to FLL circuit 10 shown in FIG. 1. A measured frequency is provided to a frequency comparator 12 at input 10b. The output of the frequency comparator 12 is coupled to a charge pump 14. The output of the charge pump 14 is provided to a loop filter 16 for shaping the waveform. The filter output is provided to a drive circuit 18. The motor driving current is controlled by drive circuit 18. The rotational speed of a motor spindle 20 is controlled by the driving current. The rotational speed of the motor spindle 20 is converted to a frequency by a V/F converter 22 and is provided to frequency comparator 12 at an input 10b as the measured frequency.

The difference between the measured frequency obtained from the rotational speed of the motor and a final target frequency is input to digital filter 30. The digital filter 30 is a filter designed so that the difference between the measured frequency and the target frequency is minimized, with the assumption that noise is present in the measured value. The output from the digital filter 30 is added to a previously set target frequency, and a value of the sum is provided to the frequency comparator 12 at input 10a in FLL circuit 10 as an adjusted target frequency. With this adjusted target frequency, the current of the motor is controlled by the FLL circuit 10. Note that although an example of the use of the FLL circuit 10 will hereinafter be described, alternative embodiments of the present invention may use a PLL circuit by replacing frequency comparator 12 with a phase comparator and replacing the loop filter characteristics with a value used for PLL control.

Figure 4:
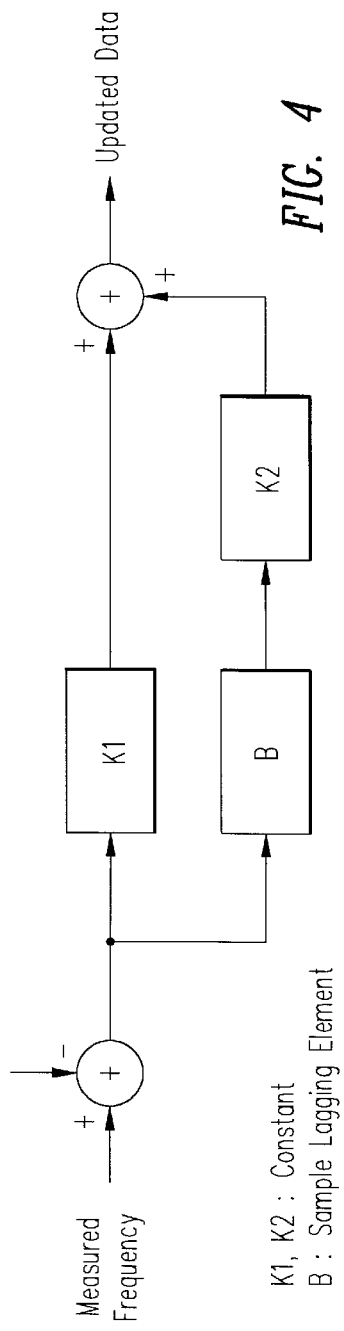
FIG. 4 illustrates a block diagram of one embodiment of a digital filter of the present invention.

FIG. 4 illustrates an example of how the digital filter 30 operates. Two consecutive sample data are obtained for the difference between a basic target frequency and a measured frequency. For each of the two sample data, computation is performed by using predetermined multiplier factors. The results are added to generate updated data. The updated data is added to the basic target frequency, and this result is input to the frequency comparator 12 in the FLL circuit as an adjusted target frequency.

For one embodiment, the zero-cross time of a back electromotive force (EMF) is used to measure the speed of a motor. The back EMF refers to the back electromotive provided by the rotor winding of the motor. By detecting (with the motor terminal) a voltage generated that is proportional to the rotational speed of the motor, pulses are obtained in synchronization with the rotation of the motor. Various other methods of obtaining pulses synchronized with the rotation of the motor may be used in alternative embodiments. For example, a sensor may be used rather than measuring the back EMF.

Figure 5:
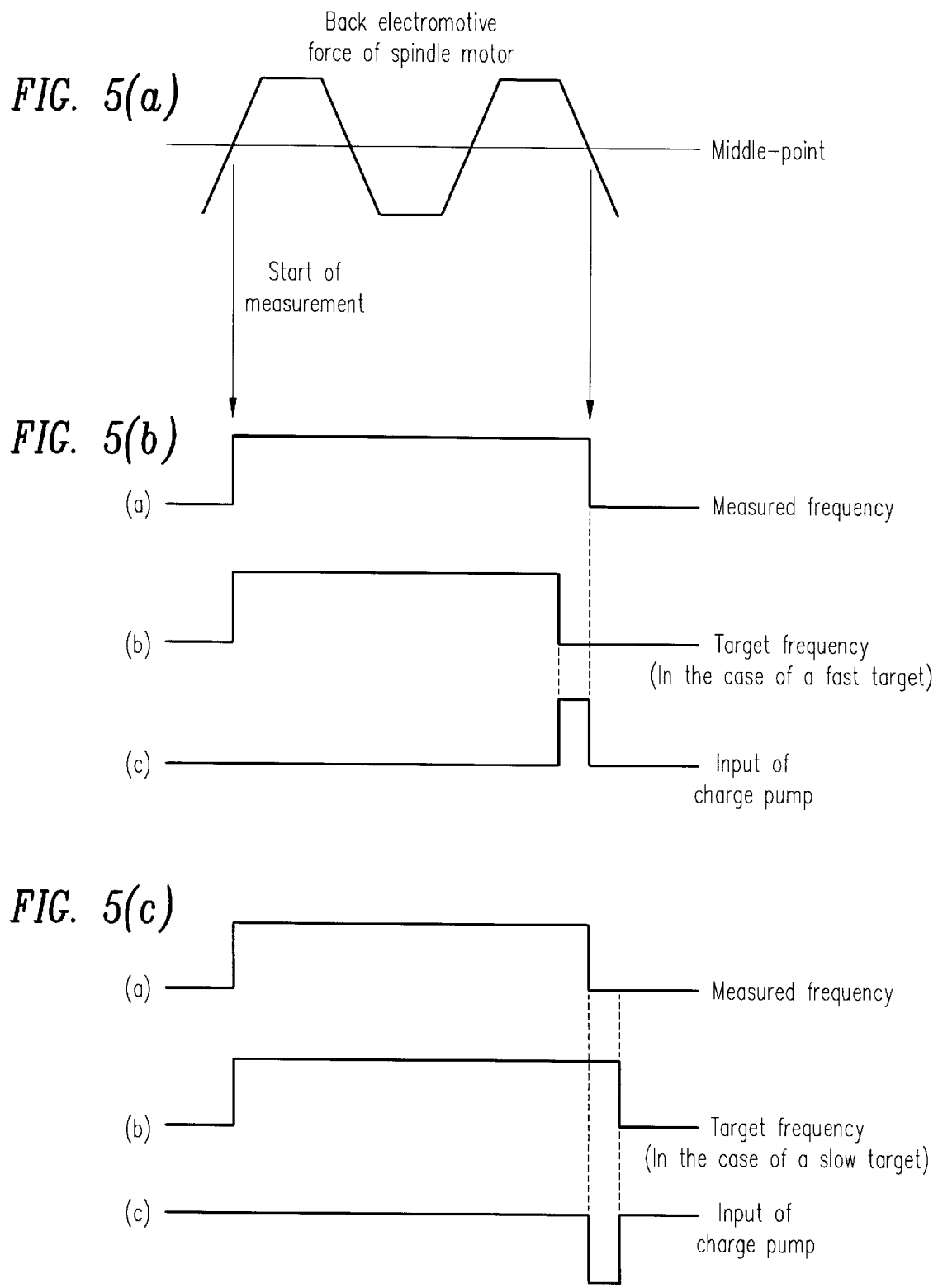
FIG. 5a–c is a timing diagram illustrating the measured frequency and target frequency for one embodiment of a motor of the present invention.

The zero-cross point of the back EMF refers to the point at which the back EMF of the rotator during rotation of the motor crosses a middle-point voltage. FIGS. 5a–c illustrate the relationship between the measurement of the zero-cross point of the back EMF and the output of the frequency comparator 12. The fluctuating voltage of the back EMF of the motor synchronizes with rotation of the motor. The back EMF of the motor is shown in FIG. 5(a). The point at which the measured voltage crosses the middle-point voltage is a zero-cross point. The interval between two predetermined zero-cross points is the frequency which synchronizes with the rotational cycle of the motor. FIGS. 5a–c illustrate examples of when a measured frequency and a target frequency may have different frequencies. In FIGS. 5a and 5b, waveform (a) represents the measured frequency, waveform (b) represents the target frequency, and waveform (c) represents the input of charge pump 14. FIG. 5(b) illustrates the situation where there is the need to increase the rotational speed of a motor. In this case, the output from the frequency comparator 12 provides a positive input to charge pump 14. When charge pump 14 receives a positive input, a constant current is supplied to the loop filter 16 causing the driving force of the motor to be increased.

FIG. 5(c) illustrates the situation where the rotational speed of a motor exceeds the target speed. In this case, the frequency comparator provides a negative input to charge pump 14. When charge pump 14 receives a negative input, a constant current is not supplied to loop filter 16 causing the driving force of the motor to be decreased.

For one embodiment, a frequency where an open loop gain attains 1 is taken to be 5 Hz, and the entire system is determined so that s1 is $5\sqrt{10}$ Hz and s2 is $5\sqrt{10}$ Hz. Using the model shown in FIG. 2 the transfer function H(s) from the target frequency to the measured frequency is uniquely determined by the following H(z) equation.

$$H(s) = \left(\sqrt{10} \cdot \omega^2 (1 + s/s1)\right) / \left(s^3/s2 + s^2 + \sqrt{10} \cdot \omega^2 s/s1 + \sqrt{10} \cdot \omega^2\right)$$

where $\omega = 2\pi \times 5$. In FIG. 2 and 3 the variables C, Gc, Gd and Gf represent the gain of the corresponding elements; K is the torque constant of the motor; and Js is the inertia of the motor.

On the other hand, when using the model shown in FIG. 3, which includes one embodiment of the digital filter of the present invention, the output of the frequency comparator 12 is an impulse that is expressed in a discrete manner with a sample time of $1/66.7$ sec. Accordingly, the transfer function H(s) is expressed by the following equation.

$$H(z) = (0.04z^2 + 0.0108z)/(z^3 - 1.85z^2 + 1.13z - 0.225)$$

Now, if the controller is controlled by PD, the adjustment target frequency $X_t$ is expressed by the following equation.

$$X_t = k_1(x(n) - xO) + k_2(x(n-1) - xO) + xO$$

where x(n)=measured frequency (t=n) and xO=basic target frequency.

For one embodiment, $k_1$ and $k_2$ may be optimized by assuming a model the external disturbance is added to the measured frequency and also added to the target frequency which is input to the FLL circuit 10. The coefficient of the digital filter 30 is determined by designing the digital filter 30 so that in the system to which these external disturbances were input, the control by the FLL circuit 10 is stabilized, that is, the influence of the external disturbances is minimized. In other words, digital filter 30 is designed so that the dispersion of the system output (see FIG. 3) is minimized (see M. Kisaka, "Proposition of Minimum Stead-State Dispersion Method," Shingaku Theory A, Vol. 1, J76-A. No. 3, pp 364–371, March 1993).

For example, if $k_1$ and $k_2$ are solved with the assumption that white noise of dispersion 0.005 has been added to the measured frequency x(n) and white noise of dispersion 1 to the adjusted target frequency, the solutions become $$k_1 = 7.89$$

$$k_2 = 5.54$$

Figure 6:
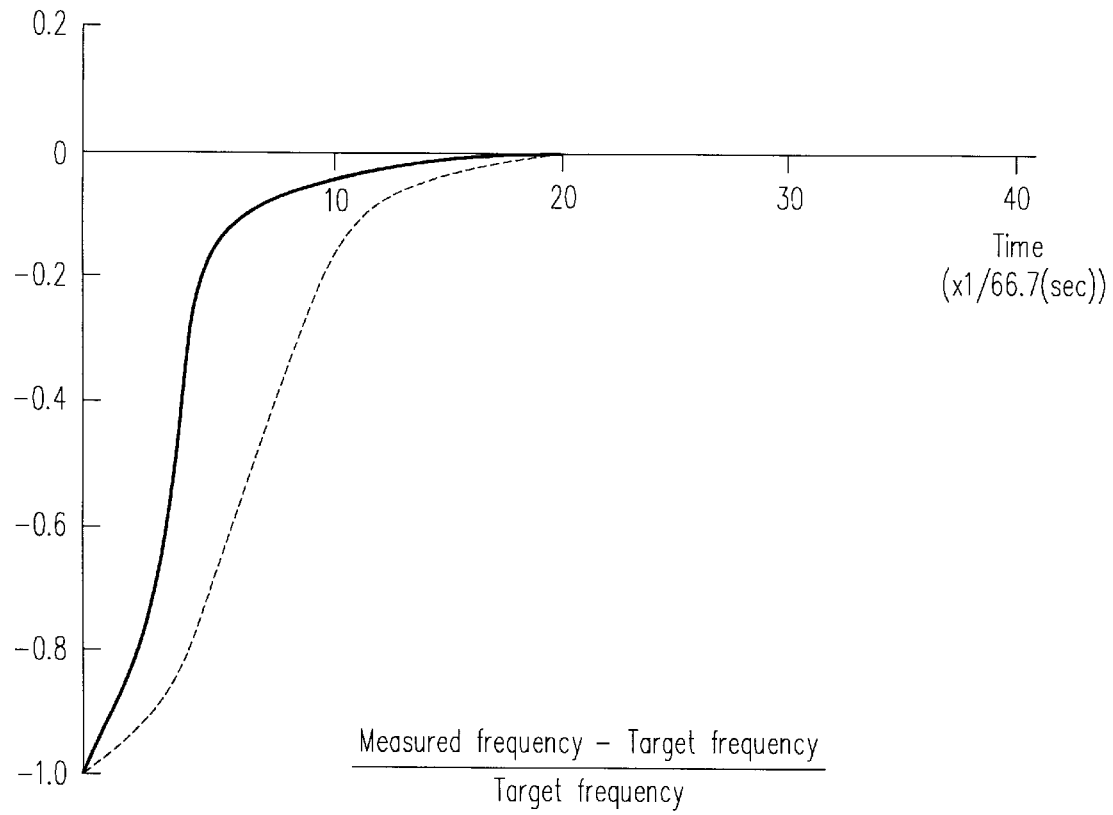
FIG. 6 is a graph illustrating the transient characteristics at the start of the motor between one embodiment of the motor control circuit of the present invention and a conventional motor control circuit.

At this time, if transient response is calculated with $$\frac{x(n) - \lambda O}{xO} = -1 \quad \text{that is,} \quad x(n) = 0 \; (n \leq 0),$$

the relationship between the rotational speed of a motor at the start of the motor and after an elapsed time is shown by a solid line in FIG. 6. As compared with a conventional transient response (dotted line) obtained, the present invention increases the speed of the motor up to a predetermined rotational speed over a shorter period of time.

Figure 7:
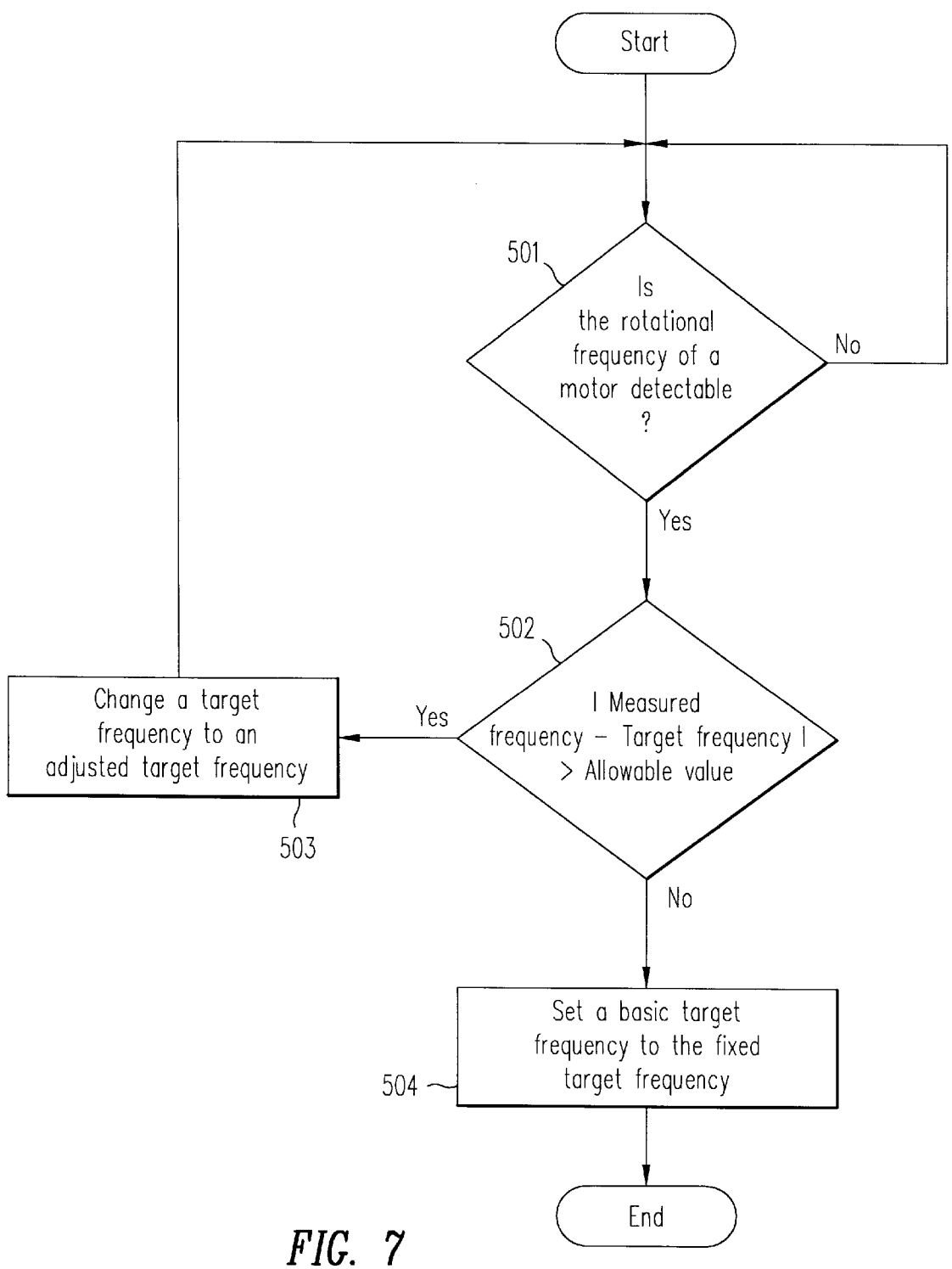
FIG. 7 is a flowchart illustrating a method of controlling the motor according to one embodiment of the present invention.

A flowchart at the start or acceleration time for one embodiment of the motor is shown in FIG. 7. Once the acceleration of the motor is started, it is determined whether the actual rotational frequency of the motor is in a measurable state as shown in step 501. For example, when the measurement of frequency is executed by a back EMF, the zero-cross point of the back EMF is measured. If the rotational frequency is not in the measurable state, step 501 will be repeated. If the rotational frequency is in the measurable state, step 501 advances to step 502. During step 502, it is determined whether or not the difference between the measured frequency and the target frequency exceeds a previously set allowable value. As an example, assume that the allowable value is 10% of the target frequency. That is, when the difference between the measured frequency and the target frequency exceeds 10% of the target frequency, step 502 advances to step 503. When the difference between the measured frequency and the target frequency is less than 10% of the target frequency, step 502 advances to step 504. In step 503, $X_t$ is obtained from the aforementioned equation which obtains the adjusted target frequency $X_t$ and it is set as a new target frequency. In step 504, a final target frequency, also referred to as the fixed target frequency, is set and normal FLL control is executed with the fixed target frequency.

Figure 8:
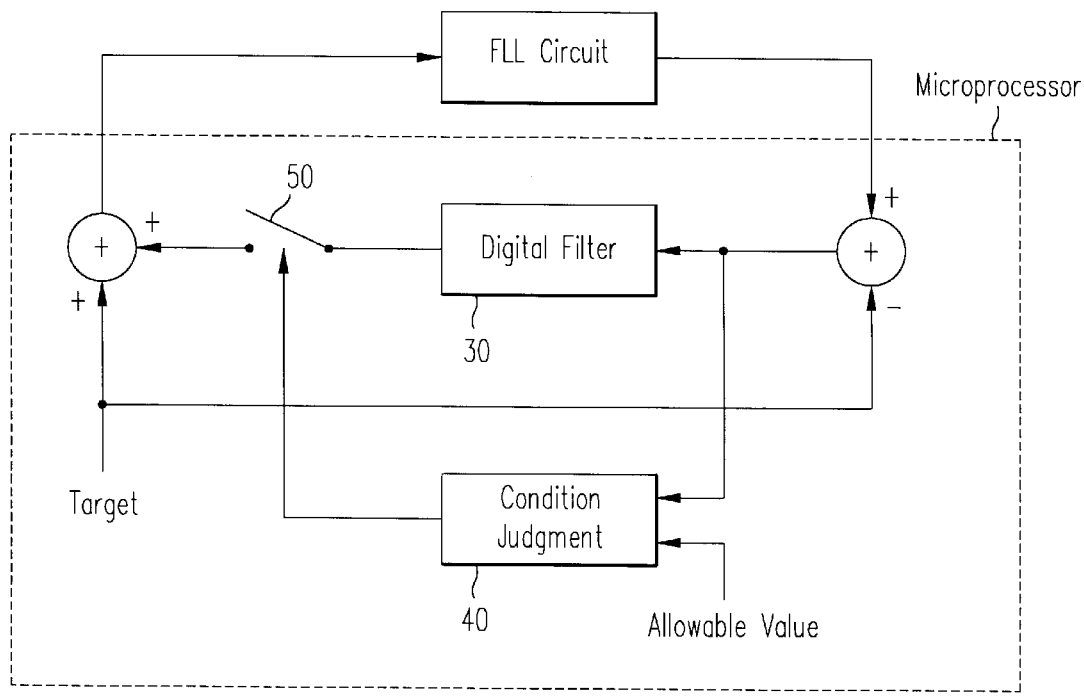
FIG. 8 is a block diagram illustrating the connection and disconnection of a digital filter in one embodiment of the motor control circuit of the present invention.

FIG. 8 illustrates a switching mechanism that may be used in the determination of step 503. The difference between the measured frequency and the target frequency is compared with an allowable value in a condition judgment block 40, and based on the result, a switch 50 is turned on and off. The judgment and the switching can be executed by a microprocessor.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A motor control circuit for controlling the rotational speed of a motor, comprising:

a frequency-locked loop (FLL) circuit having first and second inputs and an output, wherein the second input receives a feedback signal of the FLL circuit, the feedback signal having a first frequency synchronized with the rotational speed of the motor; and a filter circuit having a first input coupled to the output of the FLL circuit, a second input, and an output coupled to the first input of the FLL circuit, wherein the first input receives the feedback signal, the second input receives a target signal, and the output provides the FLL circuit with an adjusted target frequency signal having a second frequency during a transient state of the motor control circuit, and the rotational speed of the motor changes in response to the difference between the first and second frequencies.

2. The motor control circuit of claim 1, wherein the filter circuit comprises:

a digital filter having an input and an output;

a first circuit having a first input coupled to the output of the FLL circuit, a second input, and an output coupled to the input of the digital filter, wherein the second input receives the target frequency signal, and the first circuit provides an input signal to the digital filter based on the difference between the feedback signal and the target frequency signal; and a second circuit having a first input coupled to the output of the digital filter, a second input, and an output coupled to the first input of the FLL circuit, wherein the second input receives the target frequency signal, and the output of the second circuit provides the FLL circuit the adjusted target frequency signal based on the sum of the target frequency signal and the output from the digital filter.

3. The motor control circuit of claim 1, further comprising a select circuit, coupled to the filter circuit, to select one of the adjusted target frequency signal and the target frequency signal as an input signal received by the first input of the FLL circuit.

4. The motor control circuit of claim 3, wherein the select circuit selects the adjusted target frequency signal when the difference between the frequencies of the feedback signal and the target frequency signal is greater than a predetermined value and selects the target frequency signal when the difference between the frequencies of the feedback signal and the basic target frequency signal is less than the predetermined value.

5. The motor control circuit of claim 3, wherein the FLL circuit drives the motor at a relatively constant rotational speed when the select circuit selects the target frequency signal.

6. The motor control circuit of claim 3, wherein the FLL circuit increases or decreases the rotational speed of the motor when the select circuit selects the adjusted target frequency signal.

7. The motor control circuit of claim 1, wherein the filter circuit reduces the noise of the adjusted target frequency signal.

8. A disk drive system, comprising:

at least one disk to store data;

at least one head to access data from at least one of the disks; and a motor to rotate at least one of the disks such that at least one of the heads may be positioned over a desired position, the motor including a control circuit to control a rotational speed of the motor, the control circuit comprising:

a frequency-locked loop (FLL) circuit having first and second inputs and an output, the second input configured to receive a feedback signal of the FLL circuit, the feedback signal having a first frequency synchronized with the rotational speed of the motor; and a filter circuit having a first input coupled to the output of the FLL circuit and configured to receive the feedback signal, a second input, and an output coupled to the first input of the FLL circuit, wherein the second input receives a target frequency signal, the output provides the FLL circuit with an adjusted target frequency signal having a second frequency during a transient state of the motor control circuit, and the rotational speed of the motor changes in response to the difference between the first and second frequencies.

9. The disk drive system of claim 8, wherein the filter circuit comprises:

a digital filter having an input and an output;

a first circuit having a first input coupled to the output of the FLL circuit, a second input to receive the target frequency signal, and an output coupled to the input of the digital filter, wherein the first circuit provides an input signal to the digital filter based on the difference between the feedback signal and the target frequency signal;

a second circuit having a first input coupled to the output of the digital filter, a second input to receive the target frequency signal, and an output coupled to the first input of the FLL circuit, wherein the output of the second circuit provides the FLL circuit the adjusted target frequency signal based on the sum of the target frequency signal and the output from the digital filter.

10. The disk drive system of claim 8, further comprising a select circuit, coupled to the filter circuit, to select one of the adjusted target frequency signal and the target frequency signal as an input signal received by the first input of the FLL circuit.

11. The disk drive system of claim 10, wherein the select circuit selects the adjusted target frequency signal when the difference between the frequencies of the feedback signal and the target frequency signal is greater than a predetermined value, and selects the target frequency signal when the difference between the frequencies of the feedback signal and the basic target frequency signal is less than the predetermined value.

12. The disk drive system of claim 10, wherein the FLL circuit drives the motor at a relatively constant rotational speed when the select circuit selects the target frequency signal.

13. The disk drive system of claim 10, wherein the FLL circuit increases or decreases the rotational speed of the motor when the select circuit selects the adjusted target frequency signal.

14. The disk drive system of claim 8, wherein the filter circuit reduces the noise of the adjusted target frequency signal.

15. A motor control circuit for controlling the rotational speed of a motor, comprising:

a phase-locked loop (PLL) circuit having first and second inputs and an output, wherein the second input receives a feedback signal of the PLL circuit, and the feedback signal has a first phase synchronized with the rotational speed of the motor; and a filter circuit having a first input coupled to the output of the PLL circuit to receive the feedback signal, a second input to receive a target phase signal, and an output coupled to the first input of the PLL circuit to provide the PLL circuit with an adjusted target phase signal having a second phase during a transient state of the motor control circuit, wherein the rotational speed of the motor changes in response to the difference between the first and second frequencies.

16. The motor control circuit of claim 15, wherein the filter circuit comprises:

a digital filter having an input and an output;

a first circuit having a first input coupled to the output of the PLL circuit, a second input to receive the target frequency, and an output coupled to the input of the digital filter, the first circuit providing an input signal to the digital filter based on the difference between the feedback signal and the target phase signal; and a second circuit having a first input coupled to the output of the digital filter, a second input to receive the target phase signal, and an output coupled to the first input of the PLL circuit, the output of the second circuit providing the PLL circuit the adjusted target phase signal based on the sum of the target phase signal and the output from the digital filter.

17. The motor control circuit of claim 15, further comprising a select circuit, coupled to the filter circuit, to select one of the adjusted target phase signal and the target phase signal as an input signal received by the first input of the PLL circuit.

18. The motor control circuit of claim 17, wherein the select circuit selects the adjusted target phase signal when the difference between the frequencies of the feedback signal and the target phase signal is greater than a predetermined value and selects the target phase signal when the difference between the frequencies of the feedback signal and the basic target phase signal is less than the predetermined value.

19. The motor control circuit of claim 17, wherein the PLL circuit drives the motor at a relatively constant rotational speed when the select circuit selects the target phase signal.

20. The motor control circuit of claim 17, wherein the PLL circuit increases or decreases the rotational speed of the motor when the select circuit selects the adjusted target phase signal.

21. The motor control circuit of claim 15, wherein the filter circuit reduces the noise of the adjusted target phase signal.

22. A disk drive system, comprising:

at least one disk to store data;

at least one head configured to access data from at least one of the disks; and a motor configured to rotate at least one of the disks such that at least one of the heads may be positioned over a desired position, the motor including a control circuit to control a rotational speed of the motor, the control circuit comprising:

a phase-locked loop (PLL) circuit having first and second inputs and an output, wherein the second input receives a feedback signal of the PLL circuit, and the feedback signal has a first phase synchronized with the rotational speed of the motor; and a filter circuit having a first input coupled to the output of the PLL circuit, to receive the feedback signal, a second input to receive a target phase signal, and an output, coupled to the first input of the PLL circuit, to provide the PLL circuit with an adjusted target phase signal having a second phase during a transient state of the motor control circuit, wherein the rotational speed of the motor changes in response to the difference between the first and second frequencies.

23. The disk drive system of claim 22, wherein the filter circuit comprises:

a digital filter having an input and an output;

a first circuit having a first input coupled to the output of the PLL circuit, a second input to receive the target frequency, and an output coupled to the input of the digital filter, the first circuit providing an input signal to the digital filter based on the difference between the feedback signal and the target phase signal;

a second circuit having a first input coupled to the output of the digital filter, a second input to receive the target phase signal, and an output coupled to the first input of the PLL circuit, the output of the second circuit providing the PLL circuit the adjusted target phase signal based on the sum of the target phase signal and the output from the digital filter.

24. The disk drive system of claim 22, further comprising a select circuit, coupled to the filter circuit, to select one of the adjusted target phase signal and the target phase signal as an input signal received by the first input of the PLL circuit.

25. The disk drive system of claim 24, wherein the select circuit selects the adjusted target phase signal when the difference between the frequencies of the feedback signal and the target phase signal is greater than a predetermined value and selects the target phase signal when the difference between the frequencies of the feedback signal and the target phase signal is less than the predetermined value.

26. The disk drive system of claim 24, wherein the PLL circuit drives the motor at a relatively constant rotational speed when the select circuit selects the target phase signal.

27. The disk drive system of claim 24, wherein the PLL circuit increases or decreases the rotational speed of the motor when the select circuit selects the adjusted target phase signal.

28. The disk drive system of claim 22, wherein the filter circuit reduces the noise of the adjusted target phase signal.

* * * * *